(12) United States Patent
Beyda

(10) Patent No.: US 7,461,378 B2
(45) Date of Patent: Dec. 2, 2008

(54) METHODS AND APPARATUS FOR PROCESSING AN INSTANT MESSAGE

(75) Inventor: William J. Beyda, Cupertino, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 499 days.

(21) Appl. No.: 10/166,865

(22) Filed: Jun. 11, 2002

(65) Prior Publication Data

US 2003/0229722 A1 Dec. 11, 2003

(51) Int. Cl.
*G06F 3/00* (2006.01)
*G06F 9/44* (2006.01)
*G06F 9/46* (2006.01)
*G06F 13/00* (2006.01)
*G06F 15/16* (2006.01)
*G06F 17/00* (2006.01)
*G06N 5/00* (2006.01)
*G06N 5/02* (2006.01)

(52) U.S. Cl. ............... 719/313; 709/204; 709/206; 709/207; 706/45; 706/47

(58) Field of Classification Search ......... 709/206–207, 709/204; 719/310, 313; 455/466; 718/102–104; 706/45, 47
See application file for complete search history.

(56) References Cited

U.S. PATENT DOCUMENTS

| | | | |
|---|---|---|---|
| 5,742,668 A | 4/1998 | Pepe et al. | |
| 5,859,967 A | 1/1999 | Kaufeld et al. | |
| 5,991,370 A | 11/1999 | Ladd | |
| 6,175,859 B1 * | 1/2001 | Mohler | 709/206 |
| 6,301,609 B1 | 10/2001 | Aravamudan et al. | |
| 6,324,569 B1 | 11/2001 | Ogilvie et al. | |
| 6,430,604 B1 * | 8/2002 | Ogle et al. | 709/207 |
| 6,477,353 B1 * | 11/2002 | Honda et al. | 455/11.1 |
| 6,574,453 B1 * | 6/2003 | Honda et al. | 455/11.1 |
| 6,988,128 B1 * | 1/2006 | Alexander et al. | 709/206 |

(Continued)

FOREIGN PATENT DOCUMENTS

EP 0 999 509 A 5/2000

(Continued)

OTHER PUBLICATIONS

Carroll, Jim, "E-mail message filtering software set to explode," Computing Canada, Aug. 3, 1993, p. 46, v19, n16, Plesman Publications Ltd., Canada. XP-002960606.

(Continued)

*Primary Examiner*—Meng-Ai An
*Assistant Examiner*—Qing-Yuan Wu

(57) ABSTRACT

A system, method, apparatus, means, and computer program code for processing of an instant message. According to embodiments of the present invention, a sender or originator of an instant message may be sent a notification regarding one or more actions involving the instant message after the instant message is received by or at a device. One or more of the actions may take place after the instant message remains unread or unopened on the device for a given period of time. In addition, in some embodiments, the instant message may be saved, forwarded, returned to the sender, etc. after receipt of the instant message by or at the device according to one or more rules established by the sender and/or the receiver of the instant message.

12 Claims, 11 Drawing Sheets

| RULE IDENTIFIER 212 | RULE ACTION 214 | DESTINATION FOR ACTION 216 | TIMER (MIN) 218 | RULE APPLICATION 220 |
|---|---|---|---|---|
| R-1 | STORE | ON DEVICE | 30 | SUSAN |
| R-2 | STORE RESPOND | ON SERVER | 10 | LARRY FRANK ROSE |
| R-3 | FORWARD | CELL PHONE | 5 | KAREN BOSS |
| R-4 | FORWARD RESPOND | HOME EMAIL | 30 | KEN MARY |
| R-5 | RESPOND | N/A | 60 | ALL OTHERS IN BUDDY LIST |
| R-6 | DELETE RESPOND | N/A | 120 | ALL OTHER SENDERS |

210

U.S. PATENT DOCUMENTS

| | | | |
|---|---|---|---|
| 7,188,140 B1 * | 3/2007 | Greenspan et al. | 709/204 |
| 7,190,956 B2 * | 3/2007 | Dorenbosch et al. | 709/205 |
| 2002/0065894 A1 * | 5/2002 | Dalal et al. | 709/206 |
| 2002/0120600 A1 | 8/2002 | Schiavone et al. | |
| 2002/0187794 A1 * | 12/2002 | Fostick et al. | 455/466 |

FOREIGN PATENT DOCUMENTS

| | | |
|---|---|---|
| GB | 2 357 932 A | 7/2001 |

OTHER PUBLICATIONS

Palme, J., Karlgren, J., & Pargman, D., "Issues when designing filters in messaging systems, " Computer Communications, Feb. 1, 1996, pp. 95-101, vol. 19, No. 2, Elsevier Science B.V., Amsterdam. XP-004032392.

Day, et al., "A Model for Presence and Instant Messaging", Network Working Group, Feb. 2000, download from .ietf.org/rfc/rfc2778.txt on Apr. 11, 2002. 16pgs.

Gaskin, James E., Messaging: "Instant Enterprise", Apr. 24, 2002, Indepth, © 2002 CMP Media LLC, download from .internetwk.com/indepth/indepth02400.htm on Apr. 11, 2002. 7pgs.

CertifiedMail—Send free, secure, digitally encrypted e-mail from CertifiedMail.com with . . . , © 1999-2001 CertifiedMail.com, download from .certifiedmail.com/about/faq/asp on Apr. 11, 2002. 2pgs.

"Instant Messaging as an extension to E-Mail.htm", download from .lists.fsck.com/lists/impp/9908/msq00000.html on Apr. 11, 2002. 4pgs.

Stone, Adam, "Commerce Lessons from the Dark Side—M-Commerce Times", Jul. 16, 2001, download from .mcommercetimes.com/Services/149 on Apr. 11, 2002. 4pgs.

ICQ.com "(ICQ—I Seek You): What is it?", download from icq.com/products/whatisicq/html on Apr. 11, 2002. 2pgs. © 1998-2002 ICQ Inc.

Howstuffworks: "How Instant Messaging Works", download from .hostuffworks.com/instant-messaging.htm/printable on Apr. 11, 2002. © 1998-2002 Howstuffworks, Inc. 7pgs.

"Short Message Service" Webopedia.com, download from http:/www.webopedia.com/TERMS/Short_Message_Service.html on Apr. 11, 2002. 2pgs.

"Application Products, HiPath Expressions Description—Siemens Enterprise Networks", download from file://C:\WINDOWS\Temporary%20Internet%20Files\OLKBOA3\description.htm on Apr. 12, 2002. 1pg.

Application Products, HiPath Xpressions—Siemens Enterprise Networks, "Key Benefits", download from .siemensenterprise.com/prod_sol_serv/products/applications/messaging/hipath on Apr. 12, 2002. 1pg.

Application Products, HiPath Xpressions—Siemens Enterprise Networks, "Benefits and Features", download from .siemensenterprise.com/prod_sol_serv/products/applications/messaging/hipath on Apr. 12, 2000. 2pgs.

Siemens—HiPath Xpressions "Unified Messaging for Global Enterprises", Nov. 2000, © Copyright Siemens Information and Communication Networks, Inc. —4pgs.

* cited by examiner

| RULE IDENTIFIER 212 | RULE ACTION 214 | DESTINATION FOR ACTION 216 | TIMER (MIN) 218 | RULE APPLICATION 220 |
|---|---|---|---|---|
| R-1 | STORE | ON DEVICE | 30 | SUSAN |
| R-2 | STORE RESPOND | ON SERVER | 10 | LARRY FRANK ROSE |
| R-3 | FORWARD | CELL PHONE | 5 | KAREN BOSS |
| R-4 | FORWARD RESPOND | HOME EMAIL | 30 | KEN MARY |
| R-5 | RESPOND | N/A | 60 | ALL OTHERS IN BUDDY LIST |
| R-6 | DELETE RESPOND | N/A | 120 | ALL OTHER SENDERS |

| MESSAGE IDENTIFER 302 | DATE/TIME MESSAGE SENT 304 | MESSAGE STATUS 306 | MESSAGE RECIPIENT 308 | MESSAGE TIMER (MIN) 310 |
|---|---|---|---|---|
| M101 | 5/1/02 9:10 AM | OPENED 5/1/02 9:15 AM | JOE | 15 |
| M102 | 5/1/02 10:30 AM | UNOPENED STORED 5/1/02 11:00 AM | SARAH | 30 |
| M103 | 5/1/02 1:20 PM | OPENED 5/1/02 2:40 PM | MAX | NONE |
| M104 | 5/1/02 3:15 PM | UNOPENED FORWARDED 3:30 PM | HANNAH | 15 |
| M105 | 5/1/02 5:27 PM | UNOPENED STORED 5/1/02 6:12 PM | EVA | 45 |
| M106 | 5/1/02 5:40 PM | UNOPENED FORWARDED | SARAH | NONE |
| M107 | 5/1/02 6:00 PM | UNOPENED | JOE | 60 |

METHODS AND APPARATUS FOR PROCESSING AN INSTANT MESSAGE

FIELD OF THE INVENTION

The present invention relates to methods and apparatus for processing an instant message and, more particularly, embodiments of the present invention relate to methods, means, apparatus, and computer program code for conducting one or more actions after an instant message is received.

BACKGROUND OF THE INVENTION

Instant messaging is becoming a popular communications medium, both for personal and professional purposes. In a typical instant messaging system, a user may communicate with another user when both users are online and have a connection to an instant messaging server. A user can create a special list or people, known as a "buddy list" so that the user is informed when his or her "buddies" are online. Client software operating on the user's device (e.g., computer, personal digital assistant) creates a connection with the instant message server when the user logs on to the Internet or otherwise goes online. When the connection is established, the client software may send the list of designated buddies to the instant message server. The server then checks to see if any of the buddies are also online and periodically will recheck the list. When any of the user's buddies are online, the instant message server will inform the user's client software that the buddy is online and therefore is capable of sending and receiving instant messages. In addition, the buddy may be informed of the user's online presence. In this way, users can go online and know which of their designated buddies also are online at the same time and communicate with them using instant messages.

Often, when using instant messaging, a user that fails to read or that otherwise misses an instant message may suffer little, if any, consequences. The user may miss an instant message by being away from his or her client device when the message is received by the client device or by turning off the client device before the instant message is opened. In some situations, however, missing a message may have very negative consequences. For example, if a user's boss sends the user an instant message requesting an urgent response, the boss may assume that the user read or opened the message since the user's online presence was detected by the instant messaging system. Unfortunately, the user's boss has no way of knowing if the user actually received the message, if the user read or opened the message, etc.

It would be advantageous to provide methods and apparatus that overcame the drawbacks of the prior art. In particular, it would be desirable to provide a system, method, apparatus, means, and computer program code that allowed a sender or originator of an instant message to be informed or otherwise notified of an action involving the message after the sender or originator sends the instant message. In addition, it would be desirable to provide a system, method, apparatus, means, and computer program code that allowed the instant message to be saved, forwarded, returned to the sender, etc. after receipt of the instant message.

SUMMARY OF THE INVENTION

Embodiments of the present invention provide a system, method, apparatus, means, and computer program code the informing a sender or originator of an instant message regarding one or more actions involving the instant message after the sender or originator sends the instant message. In addition, in some embodiments, the instant message may be saved, forwarded, returned to the sender, etc. after receipt of the instant message. The sender or originator of the instant message may be informed that the instant message has been so saved, forwarded, etc.

Additional advantages and novel features of the invention shall be set forth in part in the description that follows, and in part will become apparent to those skilled in the art upon examination of the following or may be learned by the practice of the invention.

According to some embodiments of the present invention, a method for facilitating processing of an instant message may include determining at least one rule governing processing of an instant message; and processing an instant message in accordance with the at least one rule. In some other embodiments, a method for facilitating processing of an instant message may include determining a time period and a rule governing processing of an instant message; and processing an instant message in accordance with the rule after the time period has expired after receiving of the instant message. In some still further embodiments, a method for facilitating processing of an instant message may include determining at least one rule governing processing of an instant message; sending an instant message; and receiving a notification indicative of a processing of the instant message in accordance with the at least one rule.

According to some embodiments of the present invention, a computer program product in a computer readable medium for facilitating processing of an instant message may include first instructions for identifying at least one rule governing processing of an instant message; and second instructions for processing an instant message in accordance with the at least one rule. In some other embodiments, a computer program product in a computer readable medium for facilitating processing of an instant message may include first instructions for identifying a time period and a rule governing processing of an instant message; and second instructions for processing an instant message in accordance with the rule after the time period has expired after receiving of the instant message. In some still further embodiments, a computer program product in a computer readable medium for facilitating processing of an instant message may include first instructions for identifying at least one rule governing processing of an instant message; second instructions for providing an instant message; and third instructions for obtaining a notification indicative of a processing of the instant message in accordance with the at least one rule.

According to some embodiments of the present invention, an apparatus for facilitating processing of an instant message may include a processor and a communication port in communication with the processor, wherein the processor and the communication port are operative to facilitate determining of at least one rule for processing of an instant message; receiving of an instant message; and processing of the instant message in accordance with the at least one rule. In some embodiments, the apparatus may include additional components. In further embodiments, an apparatus for facilitating processing of an instant message may include a processor and a communication port in communication with the processor, wherein the processor and the communication port are operative to facilitate determining of at least one rule for processing of an instant message; providing of a notification indicative of the at least one rule; and receiving of a notification indicative of a processing of an instant message in accordance with the at least one rule. In some embodiments, the apparatus may include additional components.

According to some embodiments of the present invention, an apparatus for facilitating processing of an instant message may include means for identifying at least one rule governing processing of an instant message; and means for processing an instant message in accordance with the at least one rule. In some other embodiments, an apparatus for facilitating processing of an instant message may include means for identifying a time period and a rule governing processing of an instant message; and means for processing an instant message in accordance with the rule after the time period has expired after receiving of the instant message. In some still further embodiments, an apparatus for facilitating processing of an instant message may include means for identifying at least one rule governing processing of an instant message; mean for providing an instant message; and means for obtaining a notification indicative of a processing of the instant message in accordance with the at least one rule.

With these and other advantages and features of the invention that will become hereinafter apparent, the nature of the invention may be more clearly understood by reference to the following detailed description of the invention, the appended claims and to the several drawings attached herein.

BRIEF DESCRIPTION OF THE DRAWINGS

The accompanying drawings, which are incorporated in and form a part of the specification, illustrate the preferred embodiments of the present invention, and together with the descriptions serve to explain the principles of the invention.

FIG. 3 is an illustration of a representative rule information database that may be used with the method of FIG. 2;

FIG. 9 is an illustration of a representative instant message log record or database that may be used with the method of FIG. 8;

DETAILED DESCRIPTION

Applicant has recognized that there is a need for systems, means, computer program code and methods that allow or facilitate the informing of a sender or originator of an instant message regarding one or more actions involving the instant message after the sender or originator sends the instant message. In addition, in some embodiments, the instant message may be saved, forwarded, deleted, returned to the sender, etc. after receipt of the instant message by a device. In addition, the sender or originator of the instant message may be informed that the instant message has been so saved, forwarded, deleted, etc. In some embodiments, one or more rules may be established or designated by a receiver of an instant message governing processing of the instant message. Alternatively, in some embodiments one or more rules may be established or designated by a sender of an instant message governing processing of the instant message. In some still further embodiments, one or more rules may be established by a receiver of an instant message and one or more rules may be established by the sender of the instant message. These and other features will be discussed in further detail below, by describing a system, individual devices, and processes according to embodiments of the invention.

System

Figure 1:
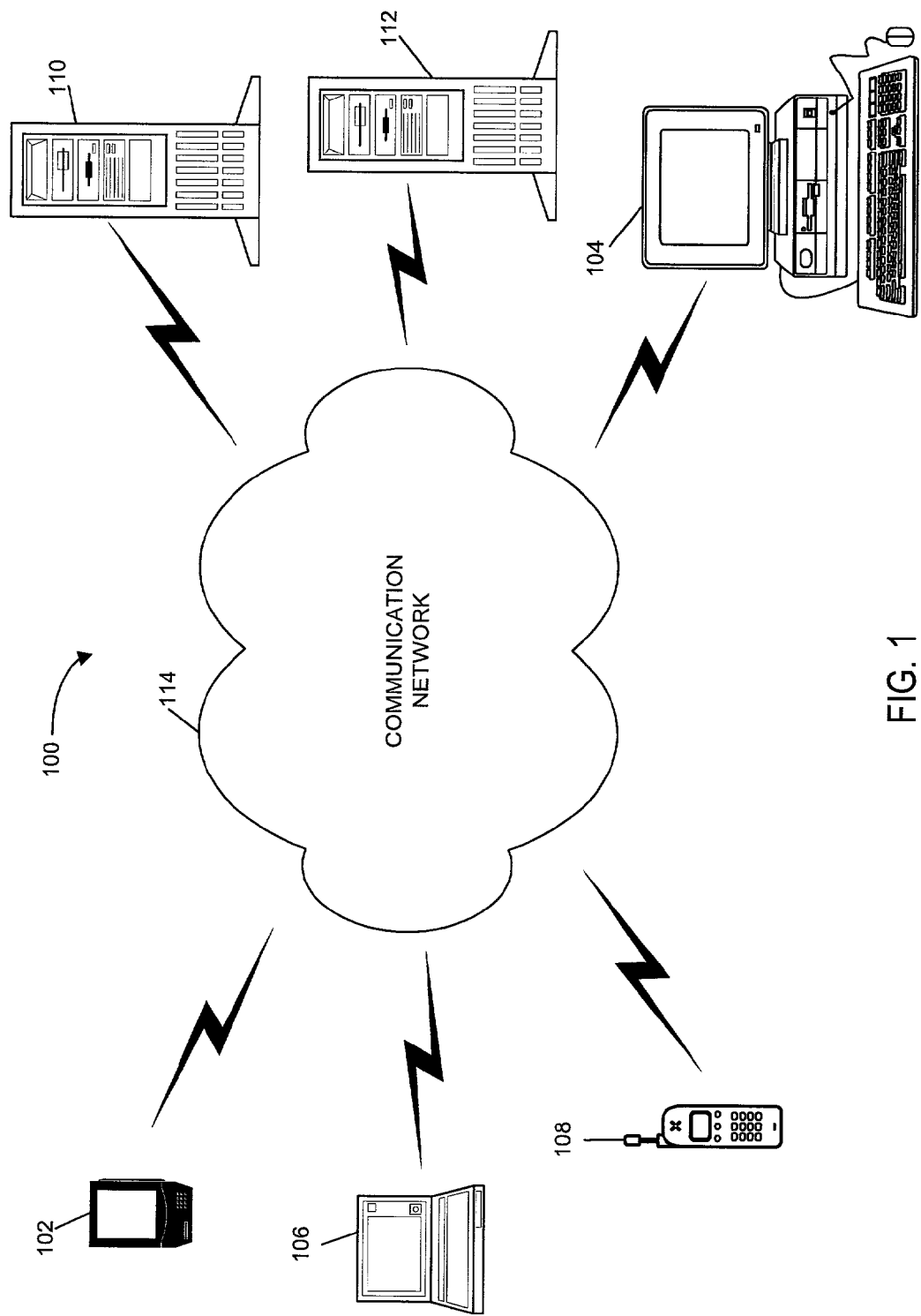
FIG. 1 is a block diagram of system components for an embodiment of an apparatus in accordance with the present invention.

Now referring to FIG. 1, an apparatus or system 100 usable with the methods disclosed herein is illustrated. The apparatus 100 may include one or more user or client devices 102, 104, 106, 108 that may communicate directly or indirectly with one or more servers, controllers or other devices 110, 112 via a computer, data, or other communications network 114.

The user or client devices 102, 104, 106, 108, preferably allow users to interact with an instant message system, service or server (e.g., the server 110) and the remainder of the apparatus 100 and to send and receive instant messages. The user devices 102, 104, 106, 108 also may enable a user to access Web sites, software, databases, etc. hosted or operated by the devices connected to or forming part of the communications network 114 and/or to send and receive instant messages. Possible user or client devices include a personal computer, portable computer, mobile or fixed user station, workstation, network terminal or server, cellular telephone, kiosk, personal digital assistant, etc. In some embodiments, information regarding one or more users and/or one or more user devices may be stored in, or accessed from, a user information database and/or a user device information database.

For purposes of discussion, but not limitation, of the present invention, the server 110 will be assumed to be an instant messaging server, thereby detecting or monitoring the online presence of users, user devices, etc. as part of an instant message system. The server 110 also may provide other services or perform other functions (e.g., Web site hosting, application or transaction processing). The server 110 can comprise a single device or computer, a networked set or group of devices or computers, a workstation, etc.

Although four user devices 102, 104, 106, 108 and two servers 110, 112 are shown in FIG. 1, any number of such devices may be included in the system 100. The devices shown in FIG. 1 need not be in constant communication. For example, a user device may communicate with a server only when such communication is appropriate or necessary. Many different types of implementations or hardware/software configurations can be used in the system 100 and its components and with the methods disclosed herein, and the methods disclosed herein are not limited to any specific hardware/software configuration for the system 100 or any of its components.

In some embodiments, the communications network 114 might be or include the Internet, the World Wide Web, or some other public or private computer, cable, telephone, client/server, peer-to-peer, or communications network or intranet, etc. The communications network 114 illustrated in FIG. 1 is meant only to be generally representative of cable, computer, telephone, peer-to-peer or other communication networks for purposes of elaboration and explanation of the present invention and other devices, networks, etc. may be connected to the communications network 114 without departing from the scope of the present invention. The communications network 114 also can include other public and/or private wide area networks, local area networks, wireless networks, data communication networks or connections, intranets, routers, satellite links, microwave links, cellular or telephone networks, radio links, fiber optic transmission lines, ISDN lines, T1 lines, DSL, etc. In some embodiments, a user device may be connected directly to a server without departing from the scope of the present invention. Moreover, as used herein, communications include those enabled by wired or wireless technology.

Process Description

Figure 2:
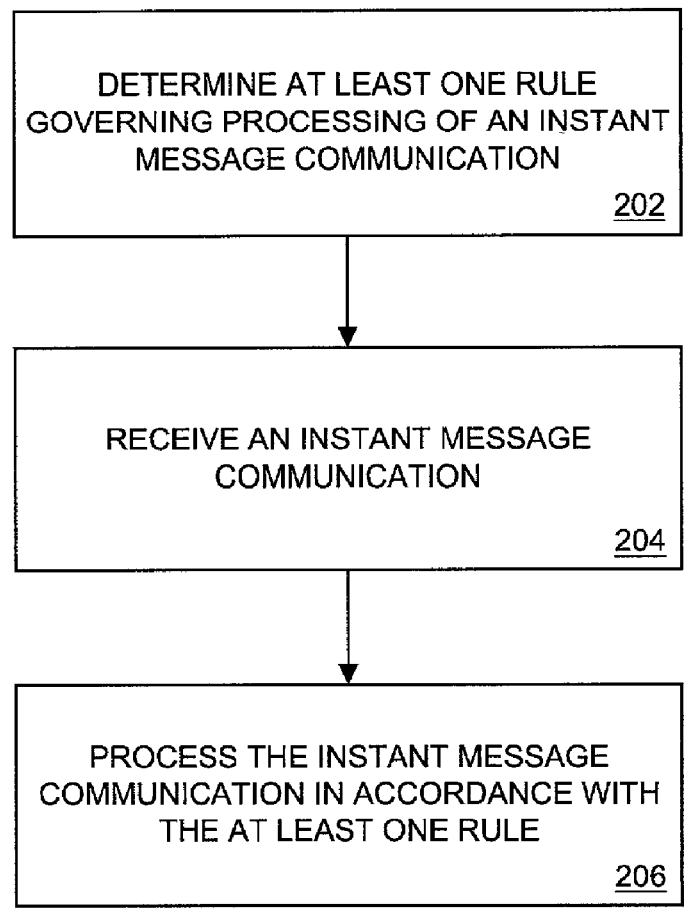
FIG. 2 is a flowchart of a first embodiment of a method in accordance with the present invention.

Reference is now made to FIG. 2, where a flow chart 200 is shown which represents an operation of a first embodiment of the present invention. The particular arrangement of elements in the flow chart 200 is not meant to imply a fixed order to the steps; embodiments of the present invention can be practiced in any order that is practicable. In some embodiments, the method 200 is particularly well suited for implementation by or on a user device or other receiver of an instant message, as will be discussed in more detail below.

Processing begins at a step 202 during which at least one rule is determined governing the processing of an instant message. The step 202 may be implemented in many different ways. For example, in some embodiments, software operating on a user device (e.g., the device 106) and operating as part of, or in conjunction with, instant message client software operating on the user device may allow the user to establish one or more rules for processing of instant messages received by the user device. In some embodiments, the user may be able or allowed to select from a menu of allowable or possible rules or otherwise be provided an opportunity to request implementation of one or more allowable or possible rules. In these embodiments the user may designate all of the processing rules that are to be applied to an instant message.

As shown by the examples above, in some embodiments the user is able to select or put in place the one or more processing rules that will apply to an instant message. In other embodiments, one or more processing rules may be established by a sender of an instant message. The one or more rules may accompany or otherwise be associated with an instant message sent by the sender to the user. Thus, in some embodiments, the step 202 may include or be determining one or more rules associated with a received instant message, as will be discussed in more detail below.

A rule governing processing of an instant message may provide many different types of procedures. For example, a user may want all instant messages received by the user via a user device (e.g., the user device 102) to be stored, forwarded, deleted, or returned to the sender. In some embodiments, different rules may apply to instant messages received from different senders, received during different periods of time, different days of the week, etc. For example, a user may want any instant message received from friends to be stored for later retrieval or reading. On the other hand, the user may want any instant message received from the user's boss to be forwarded to another user device being used by or otherwise associated with the user (e.g., the user device 106). The rule may include an email address, facsimile number, telephone number, voicemail number, buddy identifier, or other address, name, or location identifier to which to forward the instant message or a modified or reformatted version of the instant message. In other embodiments, a rule may designate how, where, how long, etc. a message is to be stored or be available in a database, memory location, store and forward system, log, etc.

As another example of a rule that may be established by a receiver of an instant message via a user device, the receiver may want nothing to happen regarding the instant message for a designated period of time after the instant message is received. If the receiver has not read or opened the instant message during the designated period of time, software operating on the user device may automatically open or otherwise display the instant message, forward the instant message to another device associated with the receiver, change the format of the instant message and send the changed message via a new delivery or communication channel, display a message on the screen of the user device, store the instant message for later viewing or retrieval by the receiver, delete the instant message, etc. For example, the receiver may want to have the instant message converted into an email message and sent to an email address, specific person, Web site, etc. designated in the rule. As another example, the receiver may want the instant message changed via a text-to-speech converter and sent to a telephone number (which may be associated with a telephone or voice mail box) designated or included in the rule. Thus, in some embodiments, a rule may designate what is to happen to a received instant message, what action is to be taken regarding a received instant message and when, etc.

As another example of a rule, a receiver of an instant message may want to notify the sender of the instant message that the receiver has not read or opened the instant message. The notification to the sender also might indicate what further action is being taken with respect to the instant message (e.g., the instant message is being forwarded, deleted, stored, etc.). If and when the receiver does open the instant message, the sender also may be notified of such action. A notification to a sender might be sent via an instant message, or some other communication channel designated in the rule. For example, if the sender is still online or if the sender's presence is otherwise detected by the instant message server, the receiving user device might send a notification to the sender via an instant message that the receiver has not yet read the instant message. If the sender is no longer online or if the sender's presence is no longer detected by the instant message server, the receiving user device might send a notification via email, facsimile transmission, voice mail, etc. as designated in the rule. Thus, in some embodiments, a rule may designate when the sender of an instant message is to be notified, how the sender is to be notified (e.g., via email, via instant message), and what the sender is to be notified about regarding the sender's instant message. For example, a notification to a sender may indicate that an instant message was received by a user device on a specific time and date, that the instant message has not been read, and that the instant message has been stored or forwarded. As an alternative, in some embodiments, a rule may designate when a party other than the sender or receiver of an instant message is to be notified, how the party is to be notified (e.g., via email, via instant message), and what the party is to be notified about regarding the sender's instant message. For example, a potential recipient of an instant message might want the instant messages to be forwarded to his or her secretary if the recipient does not read the instant message within thirty minutes of receiving it. In addition, the recipient may want a notification to be sent to the sender of the instant message to indicate that the instant message has been forwarded to the secretary.

In some embodiments, a rule may specify or designate that a receiver of instant message can conduct some action (e.g., hitting the ENTER key, click on a button on a message box displayed on a user device) to indicate that the receiver has read or at least opened the instant message.

As previously mentioned above, in some embodiments the step 202 and the rest of the method 200 may be implemented by instant messaging or other client software operating on a user device. In some embodiments, the client software may comprise middleware that intercepts instant messages when they are received, determines the appropriate rule for the instant message, and sends the instant message through to the instant messaging software operating on the user device. In some embodiments, the middleware may start or operate a timer as part of a rule, run a keystroke/mouse trap to detect user action, and/or place a popover box or window on top of the instant messaging software client window displayed on the user device. If the user touches a key or moves the mouse, the middleware may cause the popover box or window to disappear and the instant message can be read or opened. If the keystroke or mouse movement does not occur before the timer elapses, the middleware may assume that the message was not read (particularly in situations where the message is covered by the popover box or window) and implement one or more designated rules. The middleware may keep or store a database or record of rules established by the user, determined by a user device, etc.

During a step 204, an instant message is received. As previously mentioned above, in some embodiments the instant message may include a rule associated with it. Thus, the step 204 may occur prior to the step 202. In some embodiments, the step 204 may be optional and the software, device or entity that conducts the step 204 may be different from the software, device or entity that conducts other steps of the method 200. In some embodiments, the step 204 may include retrieving or receiving an instant message from instant messaging software operating on a user device after the instant messaging software has received the instant message from an instant messaging server, the sender of the instant message, etc.

Also as previously mentioned above, different rules may apply to different instant messages. For example, a first rule may apply to an instant message received from a first person while a second rule may apply to an instant message received from a second person. Different buddies listed in a user's buddy list may have different rules applied to their instant messages. Thus, in these embodiments the step 204 may need to occur prior to the step 202 so that a rule for application to an instant message can be determined in light of who sent the instant message or some other criterion (e.g., different rules may apply at different times). In other embodiments, the step 202 may include a step of allowing a user to establish one or more rules that applies to one or more different people or instant messages. This step may occur prior to the step 204. In addition, the step 202 may include a step of determining which of the established rules to apply to a given instant message received during the step 204. This step may occur after the step 204.

During a step 206, the instant message received during the step 204 is processed in accordance with the one or more rules determined during the step 202. That is, in some embodiments, the instant message may be forwarded, deleted, reformatted, stored, or otherwise processed in accordance with the at least one rule determined during the step 202.

In some embodiments a notification may be sent to the sender of the instant message that the instant message has not been opened or read, that the instant message has been stored, forward, deleted, or otherwise processed in accordance with one or more rules, etc. In some embodiments, the notification may be in the form of an instant message. In other embodiments, the notification received during may be other forms or formats (e.g., email message, facsimile transmission, voice mail message, wireless message, FTP or HTML transmission, etc.).

In some embodiments, a rule may have an associated expiration date or validity period. For example, a user may want a first rule to apply only while the user is at work (e.g., during normal work hours) and a second rule to apply only when the user is at home (e.g., during normal non-work hours). As another example, a user may want to establish one or more rules that last only during a certain period of time and lapse after the period of time has ended. As a more specific example, the user may establish a rule such that instant messages sent to the user are converted to audible messages and forwarded to the user's cellular telephone if the user has not read the instant message within five minutes when the user is approaching a project deadline and is expecting last minute changes. The user may want the rule to expire as soon as the project deadline passes.

Now referring to FIG. 3, a database or record 210 of possible rules that a user may establish or that may otherwise be determined during the step 202 is illustrated. The record 210 may include a rule identifier field 212 that may contain codes or other identifiers associated with different rules, a rule action field 214 that may indicate what is to happen to instant messages under the rules identified in the field 212, a destination for action field 216 that may include address, location, entity, or other information relating to the actions described in the field 214, a timer field 218 that may indicate how long a user device or software operating on the device is to wait after receiving an instant message before implementing an action described in the field 214, and a rule application field 220 that may include names, codes or other identifiers regarding to whom the rules identified in the field 212 are to be applied.

In some embodiments, the record or database 210 may include other or different fields or information. For example, the record or database 210 may include one or more fields that include information regarding expiration dates and/or validity periods, if any, for the rules identified in the field 212, information regarding when the rules identified in the field were established, information regarding what should be included in a response to a sender of an instant message, and/or information regarding email addresses, computer addresses, etc. where instant messages are to be stored, forwarded, etc.

As illustrated in the record 210, the rule identified as "R-1" in the field 212 applies instant messages received by a user from the person identified as "SUSAN". In addition, the rule "R-1" involves storing an instant message received from "SUSAN" on the device receiving the instant message after thirty minutes have elapsed from the time the device receives the instant message. The person identified as "SUSAN" may be included in the user's buddy list.

The rule identified as "R-2" in the field 212 applies to instant messages received by the user from the people identified as "LARRY", "FRANK" or "ROSE" wherein any such received instant message is stored on an instant message server after ten minutes have elapsed from the time the device receives the instant message if the instant message is not opened or read during the ten minute time period. In addition, a response is sent to the sender of the instant message that the instant message has not been opened or read and that the instant message is being stored. If so indicated by the rule "R-2" or default procedure, the response to the sender may include other information (e.g., location of where instant message is being stored).

The rule-identified as "R-5" in the field 212 applies to instant messages received by the user from anyone in the user's buddy list other than the people identified as "SUSAN", "LARRY", "FRANK", "ROSE", "KAREN", "BOSS", "KEN", or "MARY" wherein a response is provided to the sender of the instant message after sixty minutes have elapsed from the time the instant message is received if the instant message has not been opened or read during that time.

Figure 4:
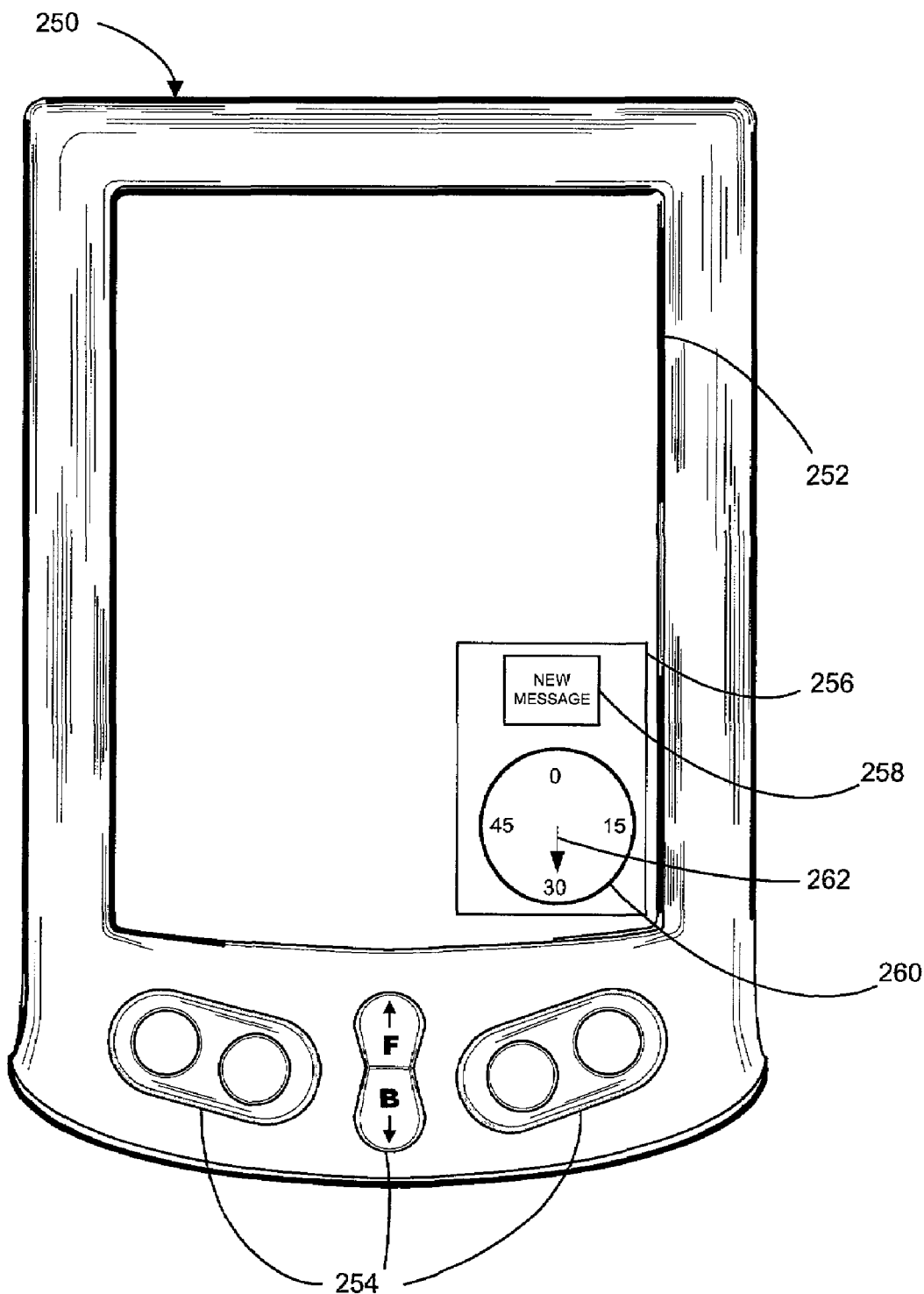
FIG. 4 is a representative diagram of a personal digital assistant that may use the method of FIG. 2 and illustrating a timer function pursuant to methods of the present invention.

Now referring to FIG. 4, a user device 250 is shown that illustrates how software resident on the device 250 may implement portions of the method 200. The device 250, which may be a personal digital assistant, may include a display or screen 252 and one or more control buttons 254. When the device 250 receives an instant message, the device 250 may display a window 256 that includes a message box 258 indicating that a new instant message has been received by the device. According to an applicable rule, the window 256 also may include a timer 260 that indicates how long a time period must elapse (e.g., thirty minutes) before further action is taken in accordance with the rule regarding the instant message (e.g., the instant message is forwarded, a notice is sent to the sender of the instant message). The timer 254 may include an illustration 262 of a moving minute hand showing elapsed time, time remaining, etc. The message box 258 may blink, change colors, etc. to indicate that a new instant message has been received.

Figure 5:
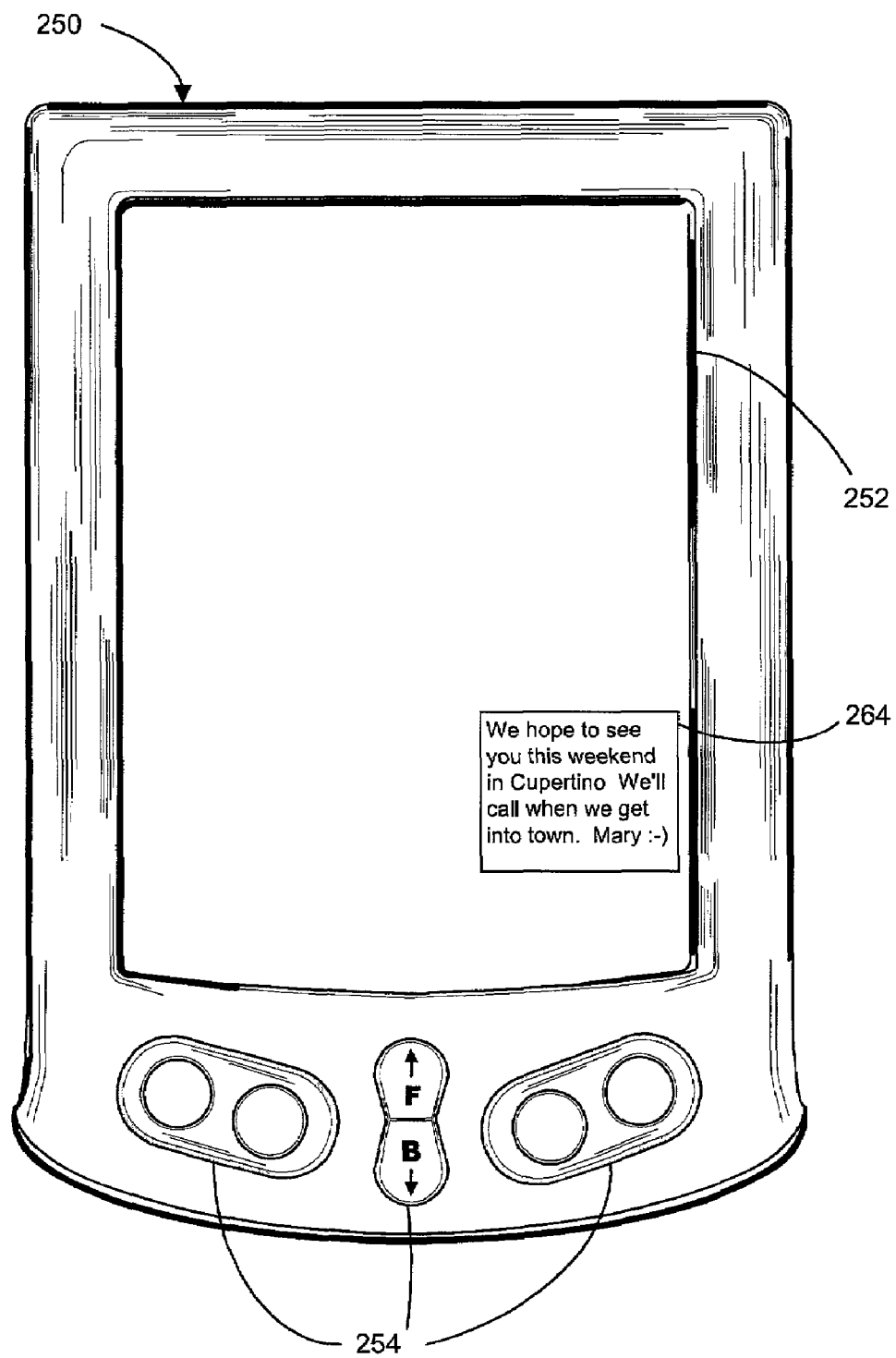
FIG. 5 is another representative diagram of the personal digital assistant of FIG. 4, wherein the personal digital assistant displays an instant message.

If the user taps on the display 252 or hits one of the buttons 254 prior to the expiration of the timer, the window 256 may disappear and the instant message displayed, as illustrated in FIG. 5, in a window 264 that was covered up by the window 256.

Figure 6:
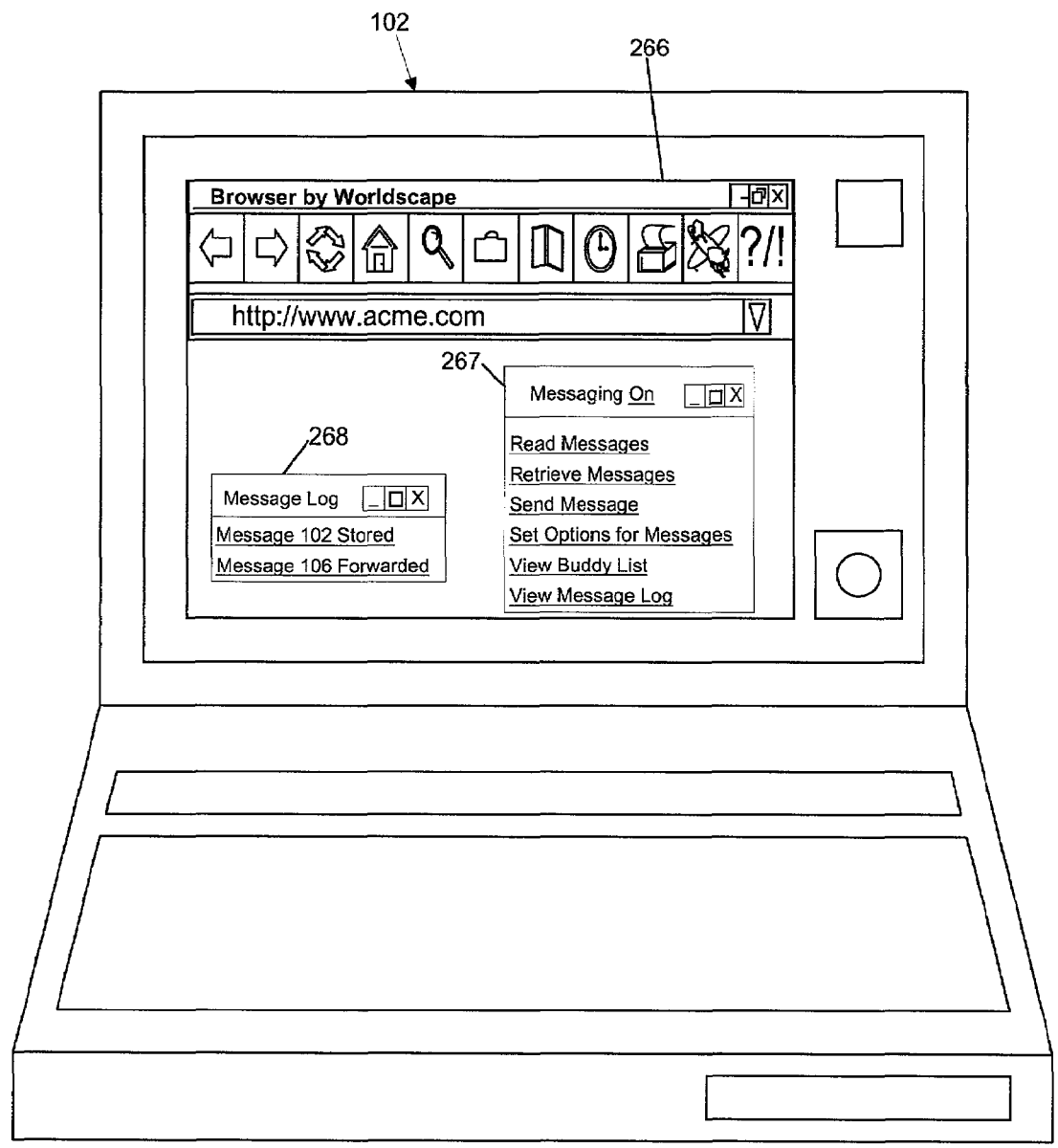
FIG. 6 is a representative diagram of a computer that may use the method of FIG. 2 and illustrating a message log window and a message control window.

Now referring to FIG. 6, the user device 102 (e.g., a laptop computer) is shown that illustrates another way in which software resident on a user device may implement portions of the method 200 for a user. The user device 102 may have a Web browser 266 operating on it and displayed on its screen when the user is online. A window 267 may allow a user to turn instant messaging on and off and conduct other activities (e.g., read instant messages, retrieved stored instant messages, send instant messages, etc.) as part of an instant messaging system. If a single instant message is received, a window such as the window 256 previously discussed above may appear. If more than one instant message is received and unread, a window 268 may appear that provides information regarding the processing of the instant messages. For example, the window 268 indicates that two instant messages identified as Message 102 and Message 106 have been received and presumably are unread. In fact, the messages may be covered up by the window 268. According to one or more applicable rules, the Message 102 has been stored and the Message 106 has been forwarded. Clicking on or selecting the appropriate link in the window 268 for a message may provide additional information regarding a message (e.g., where the message is stored, when the message was stored, when the message was received, where the message was forwarded, when the message was forwarded, etc.).

Figure 7:
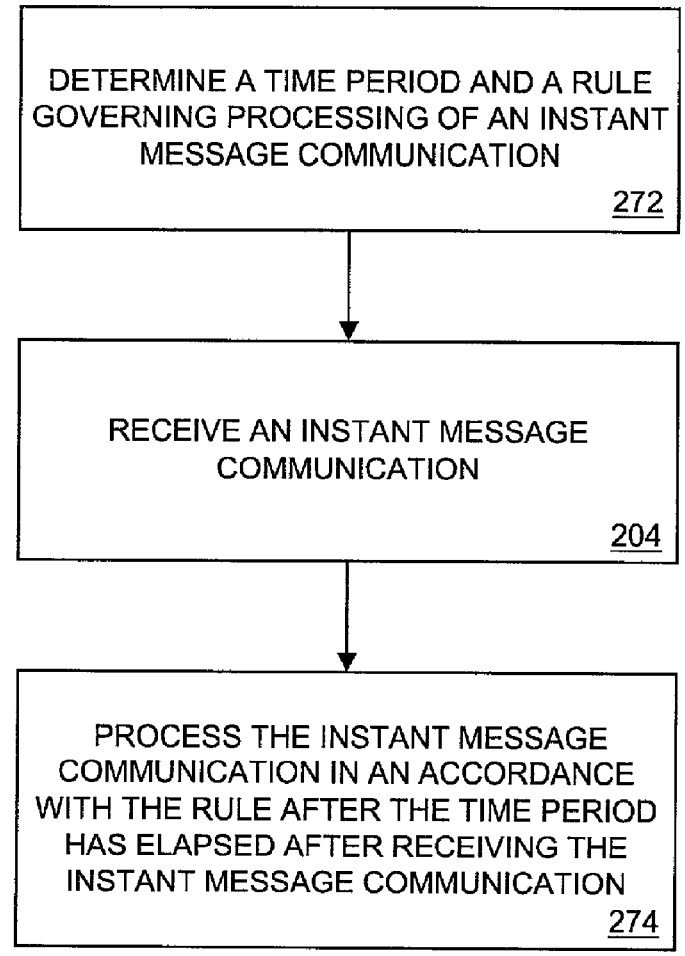
FIG. 7 is a flowchart of a second embodiment of a method in accordance with the present invention.

Reference is now made to FIG. 7, where a flow chart 270 is shown which represents the operation of a second embodiment of the present invention. The particular arrangement of elements in the flow chart 270 is not meant to imply a fixed order to the steps; embodiments of the present invention can be practiced in any order that is practicable. In some embodiments, the method 270 is particularly well suited for implementation by or on a user device that may receive instant messages, as will be discussed in more detail below. Some or all of the steps of the method 270 may be implemented by middleware or other software operating on the user device.

Processing begins at a step 272 during which a time period and at least one rule are determined governing the processing of an instant message. The step 272 is similar to the step 202 previously discussed above. The time period determined during the step 272 may be part of another rule and may govern when the at least one rule determined during the step 272 is implemented by a device receiving an instant message. In some embodiments, the time period may designate a specific time period regarding how long after the instant message is received until the at least one rule is implemented. For example, the time period may designate that the at least one rule is to be implemented in regards to an instant message thirty minutes after the instant message is received. The rule may designate an action to take place (e.g., forwarding of the instant message) if the instant message has not been read within the thirty minute time period. In some embodiments, the time period may designate a specific or recurring time for when the at least one rule is implemented. For example, the time period determined during the step 272 may specify that that at least one rule determined during the step 272 is to be implemented every hour for all unread instant messages received during the past hour.

During the step 204, an instant message is received as previously discussed above. In some embodiments, some or all of the step 272 may occur after the step 204 or as a result of the step 204. In some embodiments of the method 270, the step 204 may be optional as previously discussed above.

During a step 274, the instant message received during the step 204 is processed in accordance with the time period and rule information determined during the step 272. The step 274 is similar to the step 206 previously discussed above.

Figure 8:
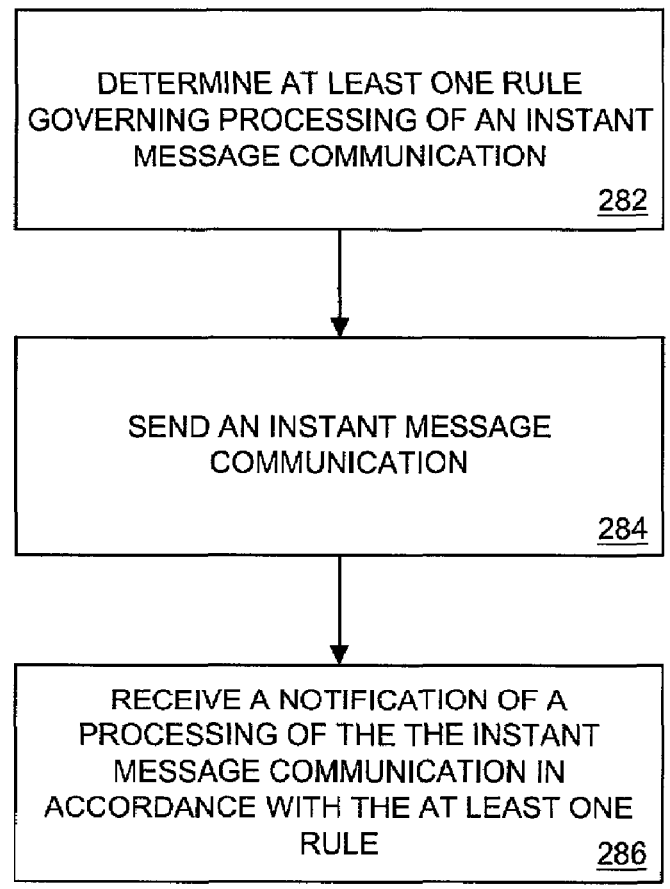
FIG. 8 is a flowchart of a third embodiment of a method in accordance with the present invention.

Reference is now made to FIG. 8, where a flow chart 280 is shown which represents the operation of a third embodiment of the present invention. The particular arrangement of elements in the flow chart 280 is not meant to imply a fixed order to the steps; embodiments of the present invention can be practiced in any order that is practicable. In some embodiments, the method 280 is particularly well suited for implementation by a user device that may send instant messages, as will be discussed in more detail below. Some or all of the steps of the method 280 may be implemented by middleware or other software operating on the user device.

Processing begins at a step 282, during which at least one rule governing processing of an instant message is determined. The step 282 is similar to the step 202 previously discussed above, except that in the method 280 the step 282 is being conducted by a sender (which might be a device) of an instant message as opposed to a receiver of the instant message. Different rules may apply to different instant message recipients, apply at different times, and/or have different associated expiration dates or time periods of validity. As previously discussed above, in some embodiments, a rule determined during the step 282 may designate a timer used to trigger the occurrence of another action.

During a step 284, an instant message is sent. In some embodiments, the instant message may include information regarding the rule(s) determined during the step 282. In other embodiments, information regarding the rule(s) determined during the step 282 may be sent, provided or distributed separately from the instant message sent during the step 282. For example, once the rule(s) are determined by a potential instant message sender during the step 282, the rule(s) may be sent in other communications or notifications to potential recipients of instant messages to facilitate processing of instant messages later sent by the sender to the one or more of the recipients.

During a step 286, a notification is received regarding the instant message sent during the step 284 in accordance with the rule(s) determined during the step 282. For example, in some embodiments a notification sent during the step 286 might indicate that the instant message has not been read or opened during a specific time period after being received, that the instant message has been stored, forwarded, reformatted (e.g., as an email message or voicemail message) or deleted, that the instant message has, in fact, been opened or read, etc. In some embodiments, a notification may include information when and/or where an instant message was stored, read, forwarded, deleted, reformatted, etc. In some embodiments, the notification may be in the form of an instant message. In other embodiments, the notification received during the step 286 may be in other forms or formats (e.g., email message, facsimile transmission, voice mail message, wireless message, FTP or HTML transmission, etc.).

Now referring to FIG. 9, a representative database or record 300 regarding instant messages sent by a sender is illustrated. The record 300 includes a message identifier field 302 that may contain codes or other identifiers associated with different messages, a date/time field 304 that may include information regarding when the messages identified in the field 302 were sent, a message status field 306 that may include information regarding the status of instant messages sent as determined by notifications received regarding the messages, a recipient identifier field 308 that may include identifiers or other information regarding the intended recipients of the messages identified in the field 302, and a message timer field 310 that may include information regarding timers or time periods associated with the messages identified in the field 302.

In some embodiments, the record or database 300 may include other or different fields or information. For example, the record or database 300 may include one or more fields that include information regarding or identifying any rules that are associated with the messages identified in the field 302, information regarding when notifications were received regarding the messages identified in the field 302, information regarding where the messages identified in the field 302 might stored or formatted, if applicable, etc.

As illustrated in the record 300, the message identified as "M101" was sent to "JOE" on May 1, 2002 at 9:10 AM and was opened on May 1, 2002, at 9:15 AM. The message "M101" had an associated fifteen minute timer that indicates that a notification regarding the message "M101" was to be sent by the receiving device to the sending device fifteen minutes after the message "M101" was received by the receiving device. The rule may have applied only if the message "M101" had not been opened or read within the fifteen minute time period.

Also as illustrated in the record 300 of FIG. 9, the message identified as "M106" in the field 302 does not have an associated timer. In some embodiments, instant messages sent to different recipients may have different rules applied to them or otherwise associated with them. In addition, the use of a timer is optional and some embodiments may not provide the timer function.

Figure 10:
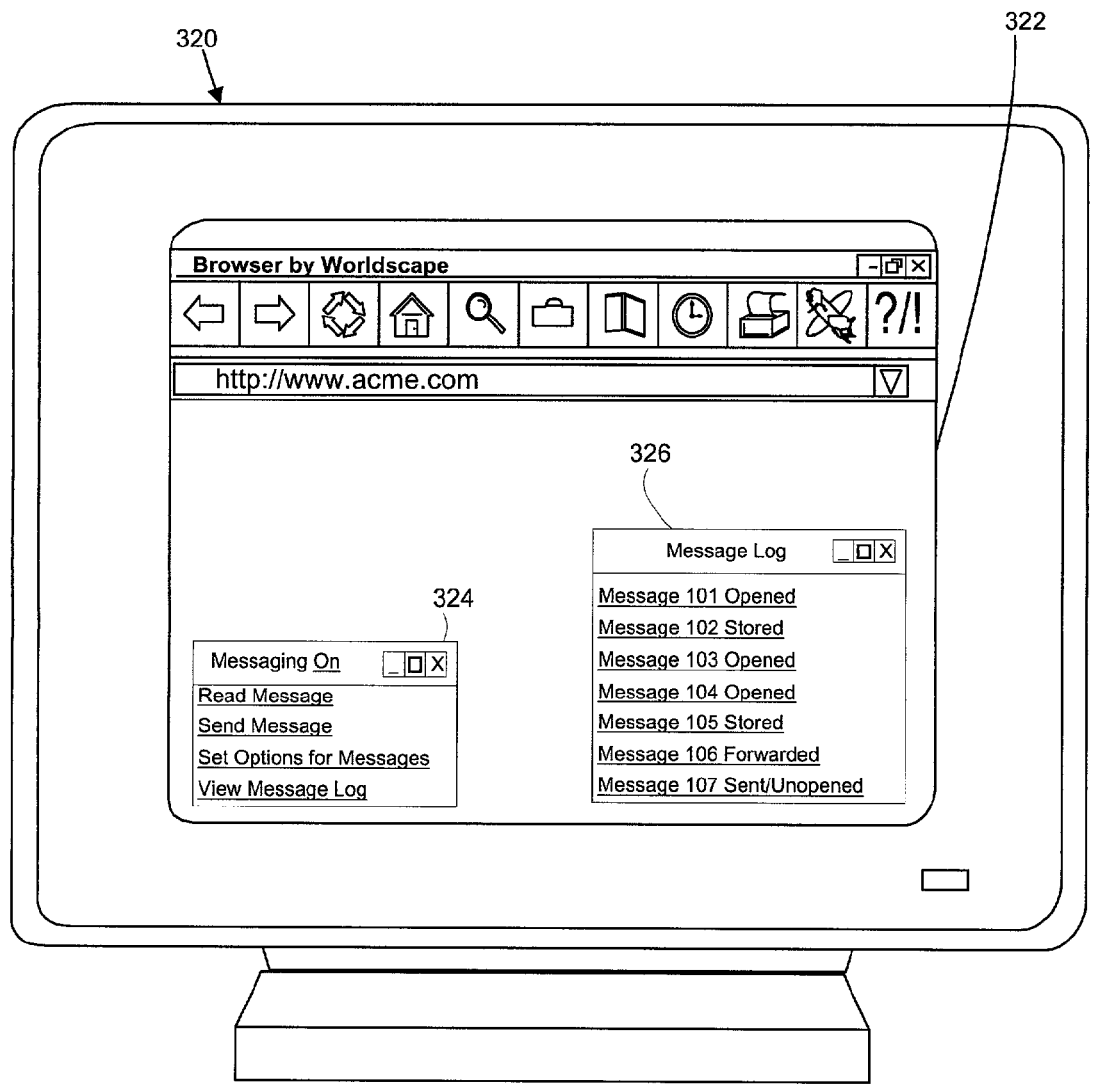
FIG. 10 is a representative diagram of a display of a user device that may use the method of FIG. 8 and illustrates an instant message log window and an instant message control window.

Now referring to FIG. 10, a display of a user device 320 (e.g., a computer) is shown that illustrates a way in which software resident on the user device 320 may implement portions of the method 280 for a user. The user device 320 may have a Web browser 322 operating on it and displayed on its screen when the user is online. A window 324 may allow a user to turn instant messaging on and off and conduct other activities (e.g., read instant messages, retrieved stored instant messages, send instant messages, etc.) as part of an instant messaging system. A window 326 may provide information regarding the processing of the instant messages sent by the device 320. For example, the window 326 indicates that seven instant messages identified as Message 101 through Message 107 have been sent by the device 320. According to one or more applicable rules, Message 102 has been stored and Message 106 has been forwarded. Clicking on or selecting the appropriate link in the window 326 for a message may provide additional information regarding a message (e.g., where the message is stored, when the message was stored, when the message was received, where the message was forwarded, when the message was forwarded, etc.) or information regarding notifications received by the device 320 regarding the instant messages.

Figure 11:
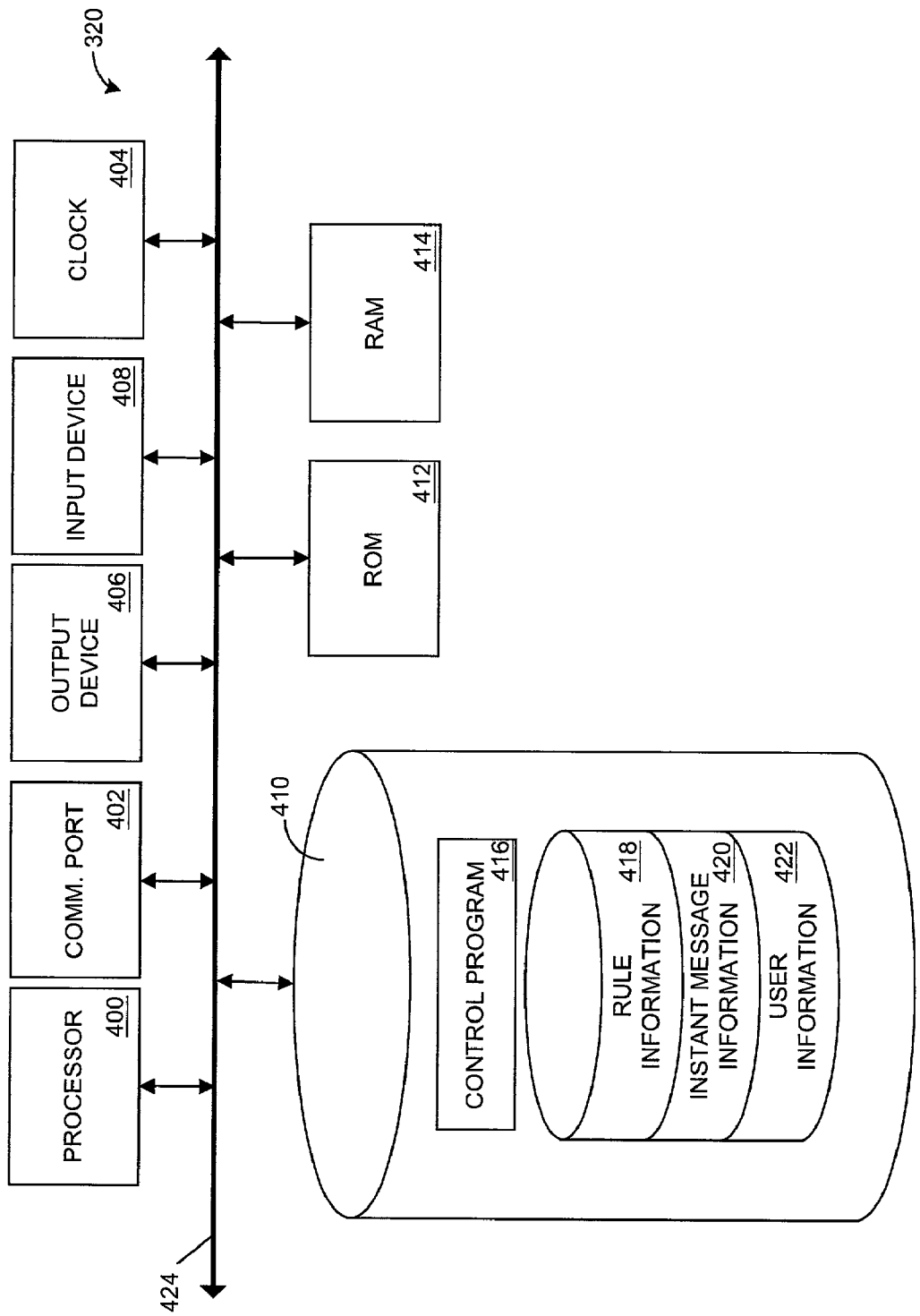
FIG. 11 is a representative diagram of a components for the user device of FIG. 10.

While only the display of the user device 320 is illustrated in FIG. 10, the user device 320 (and/or other user devices or servers discussed herein) may include one or more other components. For example, now referring to FIG. 11, the user device 320 may include a processor, microchip, central processing unit, or computer 400 that is in communication with or otherwise uses or includes one or more communication ports 402 for communicating with other devices. The processor 400 may be or include a Pentium III™ or IV™ microprocessor, manufactured by Intel Corporation. Equivalent processors are available from Motorola, Inc., AMD, or Sun Microsystems, Inc. The processor 400 also may comprise one or more microprocessors, computers, computer systems, etc. Communication ports 402 may include such things as local area network adapters, wireless communication devices, Bluetooth technology, etc.

The user device 320 may include an internal clock element 404 to maintain an accurate time and date for the user device, create time stamps for instant messages received or sent by the user device, operate timers for use with rules, etc.

The user device 320 may include one or more output devices 406, such as a printer, infrared or other transmitter, antenna, audio speaker, display screen or monitor, text to speech converter, etc., as well as one or more input devices 408 such as a bar code reader or other optical scanner, infrared or other receiver, antenna, magnetic stripe reader, image scanner, roller ball, touch pad, joystick, touch screen, microphone, computer keyboard, computer mouse, etc.

In addition to the above, the user device 320 may include a memory or data storage device 4100 to store information, software, databases, communications, device drivers, rules, message logs, timer information, etc. The memory or data storage device 410 may comprise an appropriate combination of magnetic, optical and/or semiconductor memory, and may include, for example, Random Read-Only Memory (e.g., ROM 412), Random Access Memory (e.g., RAM 414), a tape drive, flash memory, a floppy disk drive, a Zip™ disk drive, a compact disc and/or a hard disk.

The processor 400 and the data storage 410 device for the user device 320 each may be, for example: (i) located entirely within a single computer or other computing device; or (ii) connected to each other by a remote communication medium, such as a serial port cable, telephone line or radio frequency transceiver. In one embodiment, the user device 320 may comprise one or more computers that are connected to a remote server computer for maintaining databases.

Software may be resident and operating or operational on the user device 320. The software may be stored on the data storage device 410 and may include a control program 416 for operating the user device 320, implementing some or all of the methods disclosed herein, sending and receiving instant messages, etc. The control program 416 may control the processor 400. The processor 400 may perform instructions of the control program 416 and thereby operate in accordance with the present invention, and particularly in accordance with the methods described in detail herein. The control program 416 may be stored in a compressed, uncompiled and/or encrypted format. The control program 416 may include program elements that may be necessary, such as an operating system, a database management system and device drivers for allowing the processor 400 to interface with peripheral devices, databases, etc. Appropriate program elements are known to those skilled in the art, and need not be described in detail herein.

The user device 320 also may include or store information regarding users, user devices, rules, message logs, instant messages, times, communications, etc. For example, information regarding one or more rules may be stored in a rule information database 418 for use by the user device 320 or another device or entity. Information regarding one or more instant messages may be stored in an instant message log or database 420 for used by the user device 320 or another device or entity. Information regarding one or more users may be stored in a user information database 422 for use by the user device 320 or another device or entity. In some embodiments, some or all of one or more of the databases 418, 420, 422 may be stored or mirrored remotely from the user device 320.

According to an embodiment of the present invention, the instructions of the control program 416 may be read into a main memory from another computer-readable medium, such as from ROM 412 to RAM 414. Execution of sequences of the instructions in the control program 416causes the processor to perform the process steps described herein. In alternative embodiments, hard-wired circuitry may be used in place of, or in combination with, software instructions for implementation of some or all of the methods of the present invention. Thus, embodiments of the present invention are not limited to any specific combination of hardware and software.

Different components of the user device 320 may communicate or be connected directly or indirectly in a variety of ways. For example, the processor 400, communication port 402, clock 404, output device 406, input device 408, data storage device 410, ROM 412, and RAM 414 may be connected via a bus 424.

In some embodiments, one or more of the user devices 102, 104, 106, 108, 250 may include some or all of the components as the user device 320 discussed above. In some embodiments, one or more of the steps of the method 270 may be implemented by instant messaging or other client software operating on a user device (e.g, the user device 320, user device 106). In some embodiments, the client software may comprise middleware that intercepts instant messages when they are sent, determines the appropriate rule for the instant message and attaches or includes the rule information to or with the instant message, sends the instant message to the designated recipient, etc. The middleware may keep or store a database or record of rules established by a sender of instant messages, a database or record of notifications regarding instant messages sent by the sender, etc.

As previously mentioned above, in some embodiments a sender of an instant message may provide or designate all of the rules to be applied to the instant message. A rule may include a timing function that triggers occurrence of another activity (e.g., notification to the sender) upon completion of the timing function. In some embodiments, a timing function may not be used or permitted.

In other embodiments, a receiver of an instant message may designate or control all of the rules to be applied to the instant message. A rule may include a timing function that triggers occurrence of another activity (e.g., notification to sender associated with the instant message) upon completion of the timing function. In some embodiments, a timing function may not be used or permitted.

In further embodiments, the sender may designate one or more rules and the receiver may designate one or more rules. For example, a receiver may establish a processing rule that enables an action after a certain period of time has elapsed after the receiver receives an instant message. The sender of the instant message may be allowed to designate what the action is that is taken after the time has elapsed. For example, the sender may want to receive a notification regarding the status (e.g., read or unread) of the instant message. The receiver may set the timer such that the notification is sent thirty minutes after the instant message is received.

The methods of the present invention may be embodied as a computer program developed using an object oriented language that allows the modeling of complex systems with modular objects to create abstractions that are representative of real world, physical objects and their interrelationships. However, it would be understood by one of ordinary skill in the art that the invention as described herein could be implemented in many different ways using a wide range of programming techniques as well as general-purpose hardware systems or dedicated controllers. In addition, many, if not all, of the steps for the methods described above are optional or can be combined or performed in one or more alternative orders or sequences without departing from the scope of the present invention and the claims should not be construed as being limited to any particular order or sequence, unless specifically indicated.

Each of the methods described above can be performed on a single computer, computer system, microprocessor, etc. In addition, two or more of the steps in each of the methods described above could be performed on two or more different computers, computer systems, microprocessors, etc., some or all of which may be locally or remotely configured. The methods can be implemented in any sort or implementation of computer software, program, sets of instructions, code, ASIC, or specially designed chips, logic gates, or other hardware structured to directly effect or implement such software, programs, sets of instructions or code. The computer software, program, sets of instructions or code can be storable, writeable, or savable on any computer usable or readable media or other program storage device or media such as a floppy or other magnetic or optical disk, magnetic or optical tape, CD-ROM, DVD, punch cards, paper tape, hard disk drive, Zip™ disk, flash or optical memory card, microprocessor, solid state memory device, RAM, EPROM, or ROM.

Although the present invention has been described with respect to various embodiments thereof, those skilled in the art will note that various substitutions may be made to those embodiments described herein without departing from the spirit and scope of the present invention.

The words "comprise," "comprises," "comprising," "include," "including," and "includes" when used in this specification and in the following claims are intended to specify the presence of stated features, elements, integers, components, or steps, but they do not preclude the presence or addition of one or more other features, elements, integers, components, steps, or groups thereof.

The invention claimed is:

1. A computer-implemented method for facilitating processing of an instant message, comprising:
   receiving said instant message;
   determining at least one rule associated with and governing processing of said instant message, wherein said at least one rule further includes at least one of the following:
      an associated time period indicative of when said instant message should be deleted if said instant message is not read within said time period after said receiving said instant message; and
      an associated time period indicative of when said instant message should be forwarded if said instant message is not read within said time period after said receiving said instant message;
   determining a sender of said instant message;
   determining if said at least one rule applies to said instant message received from said sender;
   processing said instant message in accordance with said at least one rule, wherein said at least one rule includes an associated time period indicative of when a notification regarding said instant message should be sent to said sender of said instant message in an instance said instant message is not read by a recipient within said time period after receiving said instant message, wherein said recipient affirmatively acknowledges having read said instant message to indicate said instant message is read;
   sending said notification to said sender; and
   storing said instant message in accordance with said at least one rule in the instance said instant message is not read within said time period after said receiving said instant message.

2. The method of claim 1, wherein said determining at least one rule governing processing of said instant message includes receiving a communication indicative of said at least one rule.

3. The method of claim 1, wherein said determining at least one rule governing processing of said instant message includes receiving said at least one rule as part of said instant message.

4. The method of claim 1, wherein said processing said instant message in accordance with said at least one rule includes sending a message to a sender of said instant message regarding an action taken with regard to said instant message.

5. The method of claim 1, further comprising:
   determining if said at least one rule is applicable to a reception of said instant message.

6. The method of claim 1, further comprising:
   sending a communication to a sender of said instant message that said instant message has not been read.

7. The method of claim 1, further comprising:
   sending a communication to a sender of said instant message that said instant message has been forwarded.

8. The method of claim 1, further comprising:
   sending a communication indicative of said at least one rule to a sender of said instant message.

9. The method of claim 1, wherein said at least one rule is associated with a specific sender and said processing said instant message in accordance with said at least one rule occurs only if said instant message is from said specific sender.

10. The method of claim 1, wherein said at least one rule has an associated expiration date and said processing said instant message in accordance with said at least one rule occurs only if said at least one rule has not expired.

11. A medium having computer readable instructions stored on the medium and executable by a computer for facilitating processing of an instant message, the medium comprising:
   instructions for determining at least one rule associated with said instant message for processing of said instant message, wherein said at least one rule further includes at least one of the following:
      an associated time period indicative of when said instant message should be deleted if said instant message is not read within said time period after receiving said instant message; and
      an associated time period indicative of when said instant message should be forwarded if said instant message is not read within said time period after receiving said instant message;
   instructions for determining a sender of said instant message;
   instructions for determining if said at least one rule applies to said instant message received from said sender;
   instructions for processing said instant message in accordance with said at least one rule, said at least one rule includes an associated time period indicative of when a notification regarding said instant message should be sent to said sender of said instant message in an instance said instant message is not read by a recipient within said time period after receiving said instant message, wherein said recipient is to affirmatively acknowledge having read said instant message to indicate said instant message is read; and
   instructions for storing said instant message in accordance with said at least one rule in the instance said instant message is not read within said time period after said receiving said instant message.

12. An apparatus for facilitating processing of an instant message, comprising:
   a processor; and
   a communication port in communication with said processor, wherein said processor and said communication port are operative to facilitate:
      determining at least one rule associated with said instant message for processing of said instant message, wherein said at least one rule further includes at least one of the following:
         an associated time period indicative of when said instant message should be deleted if said instant message is not read within said time period after receiving said instant message; and
         an associated time period indicative of when said instant message should be forwarded if said instant message is not read within said time period after receiving said instant message;
      determining a sender of said instant message;
      determining if said at least one rule applies to said instant message received from said sender;
      receiving said instant message;
      processing said instant message in accordance with said at least one rule, wherein said at least one rule includes an associated time period indicative of when a notification regarding said instant message should be sent to said sender of said instant message in an instance said instant message is not read by a recipient within said time period after receiving said instant message, wherein said recipient is to affirmatively acknowledge having read said instant message to indicate said instant message is read; and storing said instant message in accordance with said at least one rule in the instance said instant message is not read within said time period after said receiving said instant message.

* * * * *